(12) United States Patent
Boling et al.

(10) Patent No.: US 6,630,044 B1
(45) Date of Patent: Oct. 7, 2003

(54) METHOD AND WIRE ELEMENT FOR RETREADING A TIRE

(76) Inventors: Goran Boling, Runeborgsvagen 39, SE-183-72 Taby (SE); Ninneh Gripenholt, Wennerbergsvagen 11, SE-531 34 Lidkoping (SE)

( * ) Notice: Subject to any disclaimer, the term of this patent is extended or adjusted under 35 U.S.C. 154(b) by 0 days.

(21) Appl. No.: 09/889,231

(22) PCT Filed: Jan. 12, 2000

(86) PCT No.: PCT/SE00/00033
§ 371 (c)(1),
(2), (4) Date: Jul. 13, 2001

(87) PCT Pub. No.: WO00/41874
PCT Pub. Date: Jul. 20, 2000

(30) Foreign Application Priority Data

Jan. 13, 1999  (SE) .............................................. 9900073

(51) Int. Cl.⁷ .............................................. B29D 30/56
(52) U.S. Cl. .......................... 156/87; 156/96; 219/547; 219/549
(58) Field of Search ........................ 156/96, 87, 130.5, 156/273.9, 274.2, 275.5; 219/547, 548, 549, 552, 553, 528, 529; 174/116; 57/902

(56) References Cited

U.S. PATENT DOCUMENTS

| | | | | |
|---|---|---|---|---|
| 975,359 A | * | 11/1910 | Hefter ........................ 219/549 |
| 1,362,351 A | * | 12/1920 | Rankin ........................ 219/553 |
| 1,416,481 A | * | 5/1922 | Longoria ..................... 219/549 |
| 1,739,012 A | * | 12/1929 | Middleton .................. 174/116 |
| 1,866,785 A | * | 7/1932 | Woock ........................ 219/549 |
| 1,984,909 A | * | 12/1934 | Woock ........................ 219/528 |
| 2,422,477 A | * | 6/1947 | Driver ........................ 338/214 |
| 2,528,503 A | * | 11/1950 | Dilworth .................... 219/552 |
| 2,822,576 A | | 2/1958 | Rowe, Jr. | |
| 3,024,827 A | * | 3/1962 | Hough ........................ 152/451 |
| 3,894,897 A | | 7/1975 | Batchelor et al. | |
| 3,922,415 A | | 11/1975 | Dexter | |
| 3,966,535 A | * | 6/1976 | Abularach ................... 156/96 |
| 4,151,027 A | * | 4/1979 | Schelkmann et al. ......... 156/96 |

FOREIGN PATENT DOCUMENTS

DE  306 999  3/1917
SE  509 079  11/1998

* cited by examiner

Primary Examiner—Geoffrey L. Knable
(74) Attorney, Agent, or Firm—Young & Thompson

(57) ABSTRACT

A method of applying a tread (3) to a tire casing (1) wherein a prevulcanized tread (3) is applied to the tire casing (1) via an intermediate layer of non-vulcanized rubber binder (2), and wherein the layer of rubber binder (2) is heated by supplying current to the layer through an electrically conductive wire (4). The wire used in accordance with the invention comprises a multiple of wires or strands (4a). The invention also relates specifically to such a multiwire element.

9 Claims, 2 Drawing Sheets

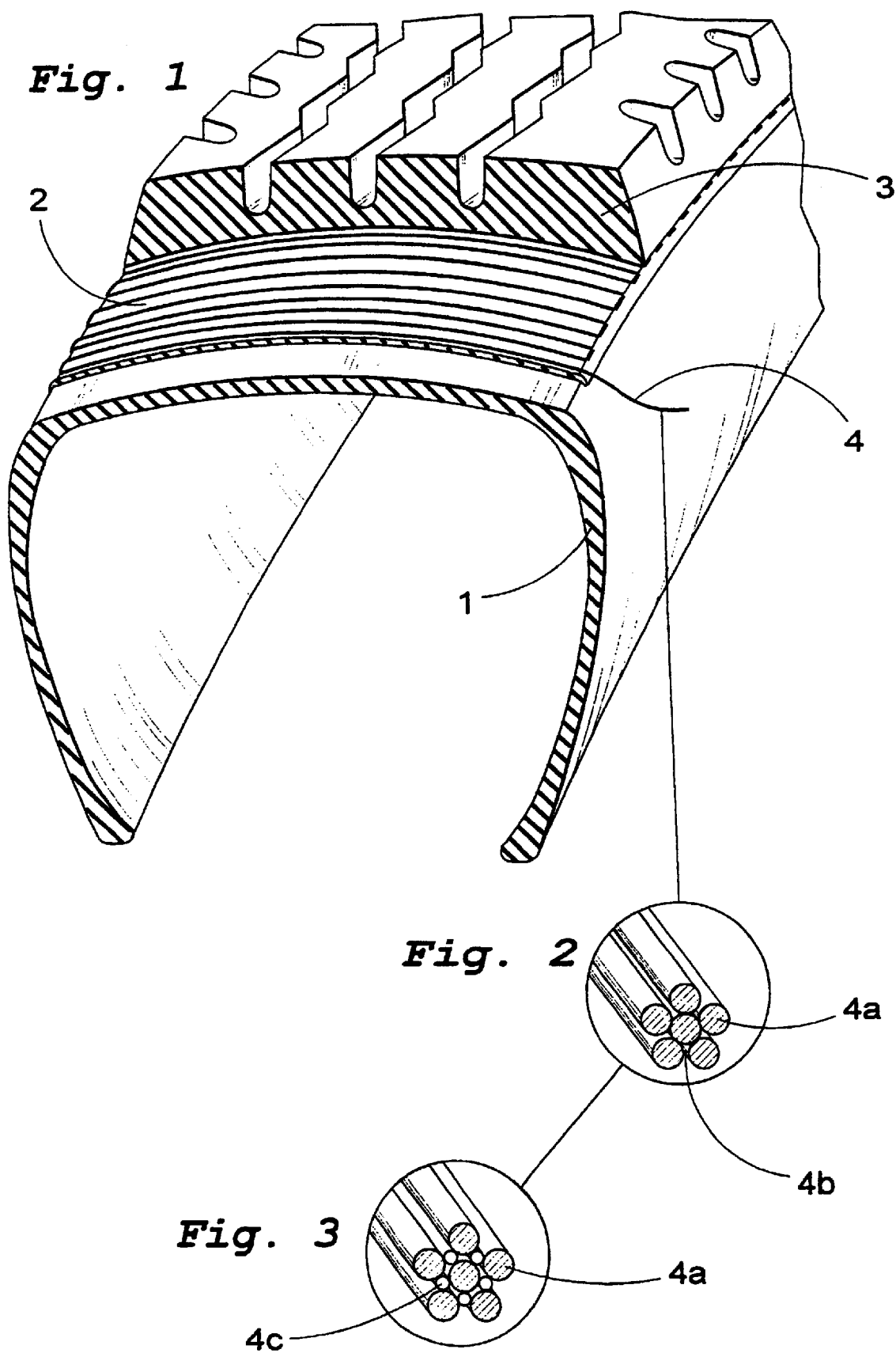

METHOD AND WIRE ELEMENT FOR RETREADING A TIRE

BACKGROUND OF THE INVENTION

The present invention relates to a method for applying a tread to a tyre casing, and then particularly for remoulding or retreading vehicle tyre casings. The invention also relates to a wire element for use when applying a tread to a tyre casing.

Worn tyres are retreaded by removing the worn tread so that only the old tyre casing remains, whereafter a new tread is applied to the casing. The tyre is retreaded by first applying a layer of binder, normally a non-vulcanised rubber binder, on the casing surface that faces towards the tread, whereafter the new prevulcanised tread is applied and the rubber binder heated, whereafter pressure is applied to the tread so as to press the tread firmly against the tyre casing.

In order for the retread to function properly, it is necessary to ensure that the tread is seated firmly on the tyre casing, and correct heating of the rubber and correct application of an external pressure onto the tread are required in order to obtain a successful result.

One method of heating the rubber binder used in recent times is to bake metallic filaments in the rubber and to deliver an electric current to the filaments so as to heat the rubber. The tyre is normally fitted with a so-called envelope that can be applied externally around the tread so as to extend down over the sides of the tyre casing, said envelope then being sealed at the bead part by a so-called open rim. The envelope is connected to a subpressure source and therewith pressed against the tread and the tyre casing. The whole of the tyre assembly is then placed in a pressure chamber in which an overpressure is generated to hold the envelope pressed against the tyre casing. Heating of the rubber binder and pressing of the envelope against the tread and the tyre casing results in vulcanisation of the binder, which is also firmly vulcanised to the tyre casing and the tread at the same time. The method also involves evacuating the vulcanisation gases that occur and also the air that is pressed out from the region between the tyre casing and the tread, by connecting the tyre assembly to a source of subpressure.

The problems that still remain with respect to the tread loosening from the tyre casing are not due primarily to a rubber binder of poor quality, but to the formation of air inclusions and vulcanisation gas inclusions as the envelope is applied to the tread, said air and gases thus being trapped by virtue of the outer edge of the tread being pressed firmly against the tyre casing so as to prevent them from being evacuated to the edge of the tyre casing/the tread and therewith evacuated by connection to the subpressure source.

SUMMARY OF THE INVENTION

Accordingly, one object of the present invention is to provide a method with which the aforesaid problems can be avoided, and particularly which will enable air and vulcanisation gas inclusions to be evacuated from the binding rubber layer.

This object is achieved by the invention in that the wires used for heating the layer of rubber binder are multiwire elements which extend out to at least the edge of the tread.

By constructing and arranging the wires in the manner proposed in accordance with the invention there is obtained between the wires a given small space that extends to the edge of the tread and that allows enclosed air and vulcanisation gases to pass through and out to the space externally of the tread, from where the air and gases can be removed by suction.

Another object of the invention is to provide a wire element which will enable air and vulcanisation gases to be transported along said wire element to the edge of the tread.

In accordance with the invention this object is achieved by heating the rubber binding layer with the aid of a multiwire element.

BRIEF DESCRIPTION OF THE DRAWINGS

The invention will now be described with reference to a non-limiting embodiment thereof illustrated in the accompanying drawings, where FIG. 1 is a schematic cross-sectional view of a tyre under manufacture with the tread shown partially broken away;

FIG. 2 is a schematic cross sectional view of a wire element according to the invention;

FIG. 3 is a schematic cross-sectional view of another embodiment of an inventive wire element;

DESCRIPTION OF THE PREFERRED EMBODIMENTS

Figure 4:
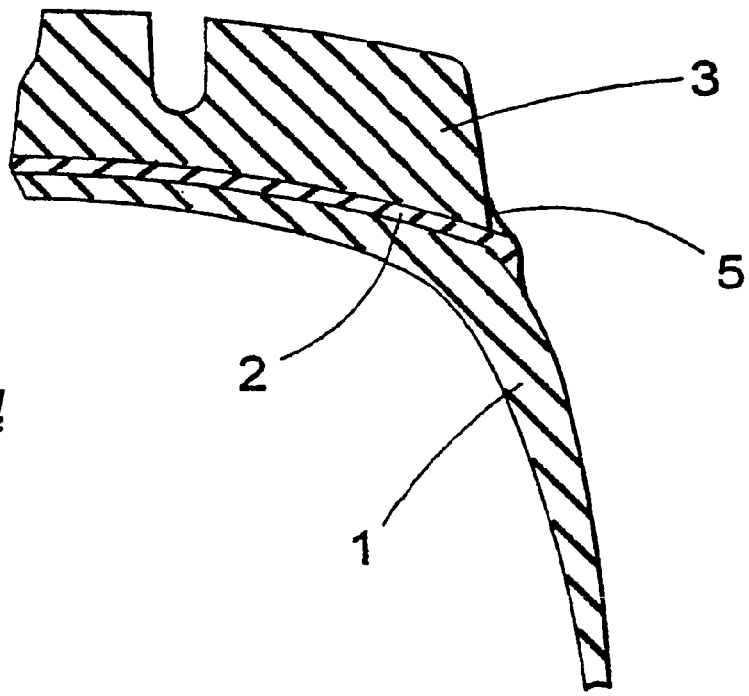
FIG. 4 is a cross-sectional view of one corner of a tyre during a retreading process prior to vulcanisation.

FIG. 1 thus illustrates a tyre casing 1 which has been prepared for retreading in some way, by removing all residues of the earlier tread among other things. A layer of rubber binder 2 has been applied to the casing 1 over a width that corresponds to the width of the casing 1 and that is at least equal to or preferably somewhat wider than the tread 3 to be vulcanised to the casing 1.

The binder layer 2 incorporates typically a metal wire element 4 which is placed transversely in said layer or obliquely to the longitudinal extension thereof. The metal wire element 4 extends forwards and backwards in a continuous loop around the full circumference of the tyre, with two ends of the wire element 4 projecting out for connection to a source of electric current so that the binding rubber can be heated sufficiently to vulcanise firmly to both the tyre casing 1 and the tread 3, when current is supplied. These parts of the method belong to known technology and are not the basis of the present invention.

Instead of using one single homogenous wire as in the case of earlier techniques, the novelty of the invention lies in the provision of a metal wire element that consists of a plurality of mutually combined wires or strands 4a. As will be seen from FIG. 2, there is formed between individual wires 4a spaces 4b through which air and vulcanisation gases can pass and follow the wire element its longitudinal extension. The wire element 4 is laid in loops, of which each loop is slightly longer than the width of the tread 3 so that said wire element 4 will lie at least flush with or immediately outside the edge of the tread. This enables the air and the vulcanisation gases that follow the wire element 4 to be removed from the rubber binding layer 2. The multiwire construction of the wire element 4 not only provides a facility for transporting air and vulcanisation gases through the rubber binder, but also improves adhesion between wire and rubber.

As before mentioned, the wires are metallic and made of a metal that can be readily heated and emit heat to the rubber binding layer, for instance such metals as copper, aluminium, iron or an alloy of different metals. This enables the wire element to be connected to an alternating current source of 220 or 380 V.

In accordance with the inventive method, a so-called envelope is fitted over the tyre casing and the rubber binder layer and tread in a known manner, so that a vacuum hose can be connected to a subpressure source and air and vulcanisation gases evacuated from the area between the tyre casing and the tread. Since this part of the method forms part of the prior art, it is not illustrated in the drawings nor described in great detail in this document.

The facilities for transporting air and vulcanisation gases along the wire element 4 can be further improved as shown in FIG. 3 by placing between the individual wires 4a a thread 4c of textile material, for instance a thread consisting of cotton, Terylene® or polyester. In addition to improving transportation of air/vulcanisation gases, the textile thread also enhances the tensile strength of the wire element 4 and also further improves its adhesion to the rubber material. The material placed in the interspaces 4b need not necessarily be in the form of a textile thread, but may alternatively be any kind of textile or porous material that will allow air and vulcanisation gases to pass along the wire element 4.

As will be seen from FIG. 4, a narrow strip 5 of textile material can be arranged outside the edges of the tread 3 and at the edges of the rubber binding layer 2, so as to prevent excessive outward flow of the rubber when heated. The narrow strip 5 of textile material extends in the circumferential direction of the tyre and also assists in circumferential transportation of air/vulcanisation gases that have been evacuated from the rubber binder layer 2 via the wires 4a, so that said air and said vulcanisation gases can be removed by suction through the vacuum hose connected to the envelope, which externally surrounds the strip 5.

Figure 5:
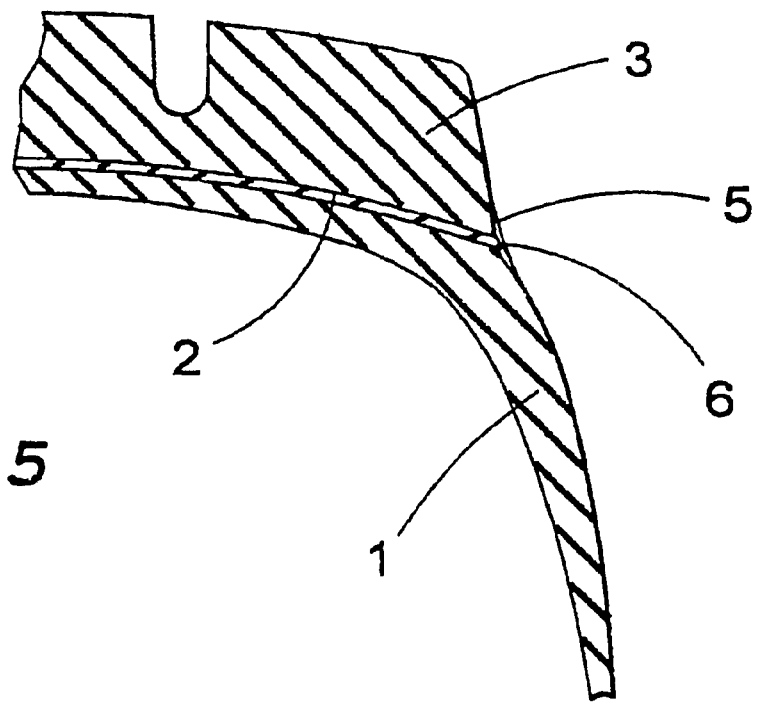
FIG. 5 is a cross-sectional view corresponding to that of FIG. 4 but subsequent to vulcanisation.

FIG. 5 shows that after vulcanisation the strip 5 remains as an outer edge on the rubber binder layer 2, the original configuration of which has now altered slightly as a result of being heated and pressed against the tread 3 and may have become slightly thinner and extended out beyond the edge of the tread 3 and there formed a circumferentially extending connecting edge 6 that covers the actual joint between tread 3 and tyre casing 1.

The strip 5, which is preferably comprised of a textile material such as cotton or a synthetic material, may alternatively comprise some other material that has corresponding properties, namely properties that will enable it to withstand at least partially the heat to which it is subjected during the vulcanisation process and which is sufficiently porous to enable air or vulcanisation gases to pass through.

The inventive method enables a tyre tread and a tyre casing to be bonded together with a considerably reduced risk of air or vulcanisation gases becoming enclosed, and therewith lesser risk of the tread releasing from the tyre casing. The construction of the wire element according to the invention also reduces the risk of the wire loosening from the rubber binder layer and therewith causing the layer to break up and therewith, in turn, causing the tread to loosen.

An inventive wire element can also be used for purposes other than for mounting a tread on a tyre casing. For instance, the wire element can be used when wishing to join two rubber sheets or layers together by heating an intermediate rubber binding layer. Such application may, for instance, concern joining conveyor belts together.

What is claimed is:

1. A method of applying a tread (3) to a tyre casing (1), comprising the steps of applying to the tyre casing (1) a prevulcanised tread (3) via an intermediate layer (2) of non-vulcanised binding rubber, supplying electric current to an electrically conductive wire (4) incorporated in the intermediate layer so as to heat said layer (2), wherein the wire is a multiwire (4a) element having ventilation passageways that extend at least to an edge of the tread, and venting gases through the passageways.

2. The method according to claim 1, further comprising the step of orientating the multiwire element (4) in loops transversely to or at an angle to a longitudinal extension of the intermediate layer (2), with the loops extending at least flush with the edge of the tread.

3. The method according to claim 2, wherein the loops extend over the edge of the tread.

4. The method according to claim 1, further comprising the step of placing a strip (5) of textile material along an edge of the intermediate layer (2) in a circumferential direction of the tyre.

5. The method according to claim 4, wherein the multiwire element (4) projects over the edge of the tread (2) to reach the strip (5).

6. A method of retreading a tire, comprising the steps of:

applying a binder layer to a surface of a tire carcass to be retreaded, the binder layer having an electrically conductive wire therein, the wire have plural strands and ventilation passageways between the plural strands, the plural strands and the passageways extending at least to an edge of the surface so that the passageways are open;

applying a tread to the binder layer;

supplying an electric current to the wire to heat the wire to attach the tread to the carcass; and venting gases through the passageways.

7. The method of claim 6, wherein the wire includes threads between the plural strands.

8. A binder layer for retreading a tire, the binder layer being a vulcanizable rubber that is arranged and adapted to fit between a surface of a tire carcass to be retreaded and a tread, the binder layer having thereon an electrically conductive heating wire that repeatedly traverses the binder layer from side-to-side and extends at least to opposite edges of the binder layer, said heating wire having multiple strands with ventilation passageways therebetween, said ventilation passageways being open at the opposite edges of the binder layer.

9. The binder layer of claim 8, wherein said heating wire further comprises threads between said plural strands.

* * * * *